(12) United States Patent
 Smithwick

(10) Patent No.: US 9,740,169 B2
(45) Date of Patent: Aug. 22, 2017

(54) HOLOGRAPHIC HIGH POWER ILLUMINATION DISTRIBUTION SYSTEM

(71) Applicant: DISNEY ENTERPRISES, INC., Burbank, CA (US)

(72) Inventor: Quinn Y. Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 151 days.

(21) Appl. No.: 14/662,913

(22) Filed: Mar. 19, 2015

(65) Prior Publication Data

US 2016/0274539 A1    Sep. 22, 2016

(51) Int. Cl.

| G03H 1/26 | (2006.01) |
|---|---|
| G03H 1/22 | (2006.01) |
| G02B 6/34 | (2006.01) |
| G02B 5/32 | (2006.01) |
| G03H 1/00 | (2006.01) |

(52) U.S. Cl.
CPC ............. *G03H 1/2645* (2013.01); *G02B 5/32* (2013.01); *G02B 6/34* (2013.01); *G03H 1/0005* (2013.01); *G03H 1/2294* (2013.01); *G03H 2001/2655* (2013.01); *G03H 2223/23* (2013.01); *G03H 2225/52* (2013.01)

(58) Field of Classification Search
CPC ........ G02B 5/18; G02B 5/32; G02B 6/02057; G02B 6/34; G02B 6/12; G02B 27/44; G02B 6/2848; G03H 1/0408; G03H 2001/2226; H01S 3/302; H01S 3/067; H01S 3/06754; H01S 3/06791
See application file for complete search history.

(56) References Cited

U.S. PATENT DOCUMENTS

| 2010/0262212 A1* | 10/2010 | Shoham | ............... A61N 5/0601 607/88 |
|---|---|---|---|
| 2012/0300044 A1* | 11/2012 | Thomas | ............. H04N 13/0425 348/51 |

* cited by examiner

*Primary Examiner* — Jennifer L. Doak
(74) *Attorney, Agent, or Firm* — Marsh Fischmann & Breyfogle LLP; Kent A. Lembke

(57) ABSTRACT

An illumination distribution system for distributing high power illumination to a set of projectors. The system includes a display element, such as a spatial light modulator (SLM), receiving light from a laser. The system includes a fiber optic array with connection locations for optical fibers. The system includes projectors that are each coupled to the fiber optic array at one or more of the connection locations with at least one optical fiber. The system includes a controller operating the display element at a first time to display a first hologram and at a second time to display a second hologram differing from the first hologram such that the laser light is split, with equal or unequal splitting ratios, into beams that are selectively directed to the connection locations of the fiber optic array (e.g., based on a 2D routing pattern used to generate the holograms).

18 Claims, 8 Drawing Sheets

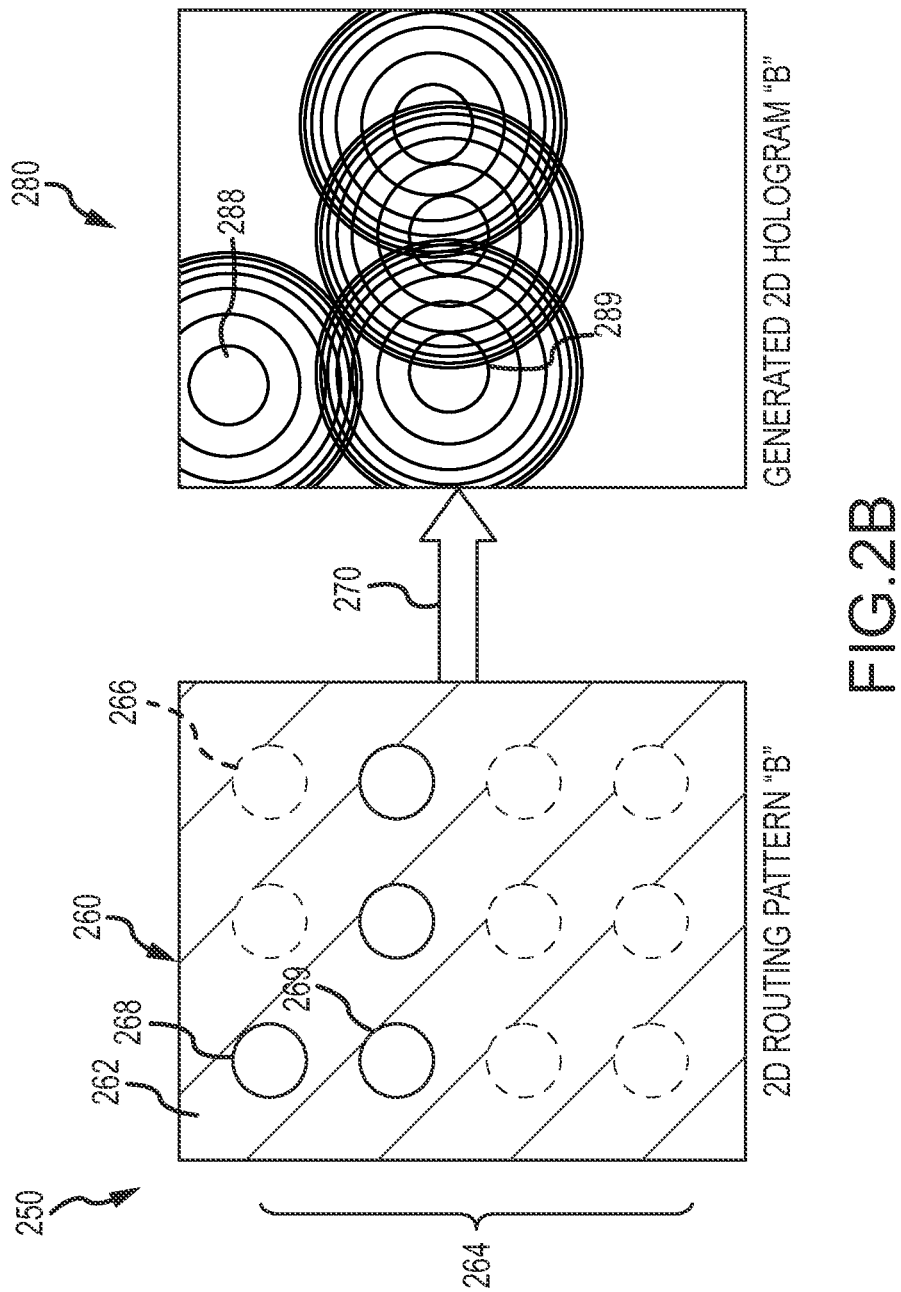

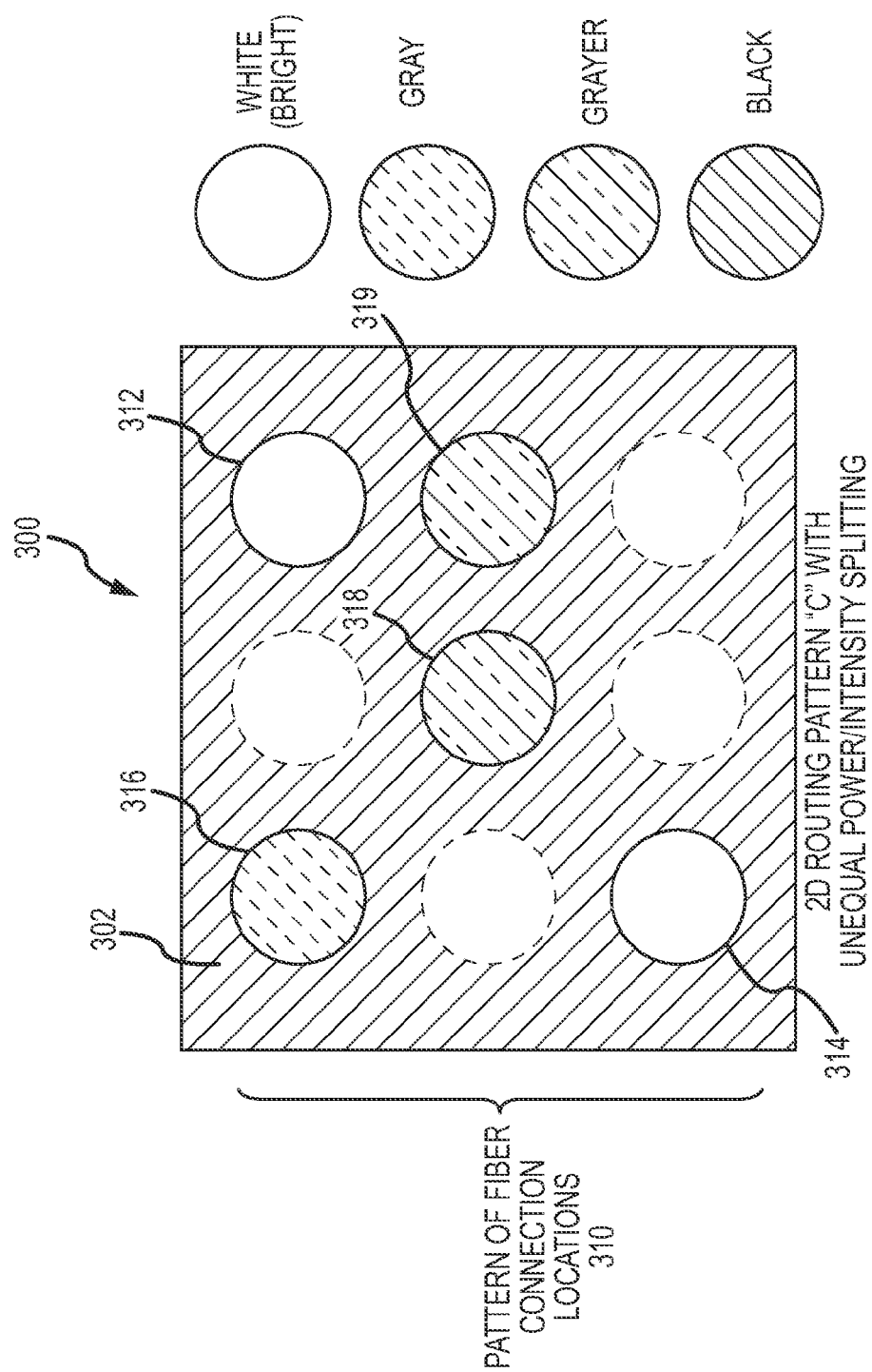

HOLOGRAPHIC HIGH POWER ILLUMINATION DISTRIBUTION SYSTEM

BACKGROUND

1. Field of the Description

The present invention relates, in general, to projection techniques and projectors, and, more particularly, to an assembly or system for splitting and/or distributing illumination, such as high power illumination including illumination, light, or output of a laser engine or laser light source, to one-to-many projectors and/or to other illumination output devices (or illumination-using devices).

2. Relevant Background

Projectors and similar illumination/light output devices are used in many settings to create entertaining displays in theaters, amusement parks, and other environments. Over the years, there has been a continued demand for brighter and more efficient light sources for projectors, and projector light source technology has seen many changes in recent years. From improvements to the traditional projector lamp to the introduction of lasers as light sources, the newest projector light sources are more efficient and longer lasting than prior projector light sources.

The majority of existing projectors use lamps as a light source, but it has proven difficult to meet demands for higher luminance or higher power projectors with these light sources. Xenon arc lamps may be used as a "high" luminance or power light source, but even these lamps are often too dim and are often not very long lived, which can increase maintenance requirements. More recently, projectors have been designed and distributed that utilize laser light sources, e.g., blue laser phosphor models of laser light sources (or, more simply, laser sources). These projector light sources are desirable as they can provide high power (or luminance), e.g., thousands of lumens with some laser projectors being rated at 6000 lumens, and laser sources for projectors are durable and long lasting (e.g., tens of thousands of hours of use).

With these improvements in mind, the cinematic projection industry is moving towards laser projection to achieve higher screen luminance. In part, the move to laser sources for projectors is driven by the need to compensate for the brightness reduction observed when projecting time-multiplexed or polarization-based stereographic three-dimensional (3D) movies. Laser sources and digital projection are desirable to provide images with larger dynamic range, greater color gamut, and higher frame rates. When compared with conventional lamps (such as xenon lamps), laser sources are also more efficient, are more consistent in output, and have longer life spans.

While laser sources are capable of producing extremely bright illumination, laser sources are typically very expensive when compared with traditional projector light sources. To address the cost issue, there has recently been a move toward using a centralized laser source and dividing its output between multiple optical fibers for delivery to wavelength converters (e.g., infrared (IR) to visible color) and projector heads. This arrangement is sometimes referred to as "a light farm." The light farm may have racks of lasers with an efficient power system and central cooling. Light is distributed to one or several projector heads. Each projector head may also still need cooling, but such cooling fans can be smaller and be quieter than the fans used to cool the remote laser(s) and than projectors with integrated light sources, which is desirable in many projection settings where the projector may be near the viewing audience. The projector heads may be smaller than projection units with integrated light sources and may be mounted in the viewing room eliminating the need for a separate projection room.

Demonstrations and sales of cinema laser projectors have already occurred and installations will likely gain momentum in the near future as new laser sources and projectors become available. In initial systems for theme parks and other settings, laser projection will likely be provided by a retrofit of existing xenon lamp projectors, and, as a result, these systems will not experience the benefits of a centralized light farm. As new theaters and attractions are built or refurbished, light farms likely will be incorporated into the designs. However, the fiber network topology or layout and light splitting and distribution will likely be concurrently designed and will be static, e.g., the splitting of outputs from a centralized laser will be defined at the time of building or refurbishing the theater or attraction.

SUMMARY

It was recognized that the advantages of a light farm and laser projection systems also extend into projection systems for amusement (or theme) parks. For example, with a central laser source feeding multiple projector heads, there will be more consistent color balance and brightness between projected imagery throughout an attraction. Each projector head (e.g., a light modulator and projection optics) becomes quieter and more compact (when compared with traditional lamp-based projector heads), and this allows for flexible head sizes and placement in a theater or attraction space. A central light source, in some embodiments described herein, is used to simultaneously feed multiple projectors (or projector heads), which may vary in size, color, brightness, and other projection parameters as the distributed light is selectively split/distributed.

It was further recognized that light farms and light distribution networks with fixed or static configurations may be undesirably restrictive for theme park attractions and many other use environments. For example, adding and rearranging projectors becomes difficult with a static distribution/splitting arrangement as attractions are developed and grow, as attractions are rethemed, and as new attractions are added with projectors using the output of the centralized light farm. Hence, a more ideal light farm distribution system is described herein that is reconfigurable, is extendable, and provides a "plug-and-play" design (e.g., new distribution fibers that are optically coupled to projector head/output devices can be added or deleted quickly and easily from a distribution array or panel).

To this end, the illumination distribution system includes a holographic, high-power illumination distribution module or assembly (or holographic distribution assembly). The holographic distribution assembly is able to handle high optical power laser inputs (e.g., hundreds of Watts up to one or more kilowatts whereas existing solid state splitter devices are unable to handle such high power inputs often only handling less than a Watt to several Watts), and the holographic distribution assembly can provide high-speed, reconfigurable interconnections with flexible splitting ratios into a fiber array. The interconnections are "reconfigurable" in that the laser output/illumination output from the holographic distribution assembly can be quickly switched from one pattern to another pattern to provide the laser output, in a divided/split manner, to inlets/input ends of differing optical fibers for distribution to differing sets of projector heads. Flexible splitting ratios are provided by the holographic distribution assembly as the illumination from the laser source (e.g., from a laser farm) can be split into output streams with differing powers (differing ratios) in a switched (or time-multiplexed) manner.

The ability to dynamically and rapidly configure and switch light to selected fibers and projectors is provided by the illumination distribution system described, and this provides flexibility and numerous desirable capabilities. For example, the distribution system may use the holographic distribution assembly to, during intermissions or between shows, redirect light from empty theaters to occupied theaters. Similarly, as riders move from scene-to-scene in an attraction or ride of an amusement park, the light from the light farm may be redirected to only those projectors that are presently being used to display imagery to the riders. In projection systems with time-sequential color, infrared (IR) light may be sequentially fed between the wavelength converters (e.g., converting IR to visible color). In projection with blanking periods between frames, the laser-provided illumination or light may be redirected during the blanking period to other projectors. The light may be switched among redundant fiber feeds between the light farm and the projector heads, which provides insurance in case of fiber breakage or repair.

More particularly, an illumination distribution system is provided for splitting and distributing high power illumination (e.g., laser output or laser light) to any of a number of projectors (or projector head or similar projection devices). The system includes a display element laser illumination (e.g., from a laser providing monochrome laser light, infrared radiation (IR), time sequenced colored light, or red-green-blue light). The system also includes a fiber optic array with a plurality of connection locations for optical fibers. The system includes a set of projectors that are each coupled to the fiber optic array at one or more of the connection locations with at least one optical fiber.

Further, the system includes a controller operating the display element at a first time to display a first hologram and at a second time to display a second hologram differing from the first hologram. During the first time period, the first hologram splits the received collimated light from the laser into a number of beams that are directed onto a first set of the connection locations, and during the second time period, the second hologram splits the received collimated light from the laser into a number of beams that are directed onto a second set of the connection locations differing from the first set of the connection locations. The holograms may be used to provide an equal splitting of the received collimated light or to provide an unequal splitting or an unequal splitting ratio (e.g., 20 Watt light may be divided into two 5 Watt beams and one 10 Watt beam).

In some implementations of the system, the display element takes the form of a spatial light modulator (SLM), and the received collimated light has a power rating of at least 5 Watts (e.g., high power illumination may be several hundreds of mW or, more typically, will be laser light from a 5 W or more powerful laser source such as one providing hundreds of Watts of power). The controller may be configured to switch between displaying the first hologram and displaying the second hologram at a rate of at least 144 Hertz in some applications and for periods of several minutes or hours in other applications. For example, it may be useful to provide 24 frames per second with six colors for color-sequential Dolby 3D, but it may also be useful to switch after each movie or scene (which may be a few minutes up to several hours).

To improve efficiencies (e.g., to not waste received collimated light), the first and second holograms can each take the form of a blazed grating hologram. In other cases, though, the first and second holograms generate diffractive pairs, and each of the diffractive pairs is directed onto one of the connection locations of the fiber optic array. In other implementations, the first and second holograms produce zero order light from the received collimated light, and the zero order light is directed to one of the connection locations, is reflected with a mirror back into the laser, or is captured and returned to an inlet of the laser.

BRIEF DESCRIPTION OF THE DRAWINGS

FIGS. 2A and 2B schematically illustrate generation of two different 2D holograms for use in feeding laser output, in two different ways (which can be provided in a switched manner or time-multiplexed manner) to a fiber optic array;

FIG. 3 illustrates a 2D routing pattern for use as input to the 2D hologram generation process, with the 2D routing pattern providing different intensities or power levels to the subset of distribution fibers of a fiber optic array (e.g., providing an unequal splitting ratio to ends of optical fibers connected to the fiber optic array);

DETAILED DESCRIPTION

The inventor recognized that with the growing use of lasers in projection systems that there would be a growing trend to control costs and provide efficient cooling to use one or more lasers in a central location (or a "laser farm") to provide high power illumination or laser light to distributed projectors. In this way, the use of lamps in projector heads can be eliminated to provide projection with high illuminance and yet reduce maintenance of the projector heads and provide quieter projectors (e.g., as cooling fans can be much smaller with the removal of the lamps) that can be placed in close proximity to viewers. With this recognition in mind, the inventor proposes the use of holographic distribution (i.e., with a holographic distribution assembly) of the high power illumination to the projectors so as to provide an efficient, reconfigurable ("plug-in-play" of distribution fibers in a fiber optic array to allow ready addition and deletion of projectors without turning off the power), solid state (i.e., no moving parts) technique of rapidly splitting and distributing output of a high power laser light source to multiple projectors.

Figure 1:
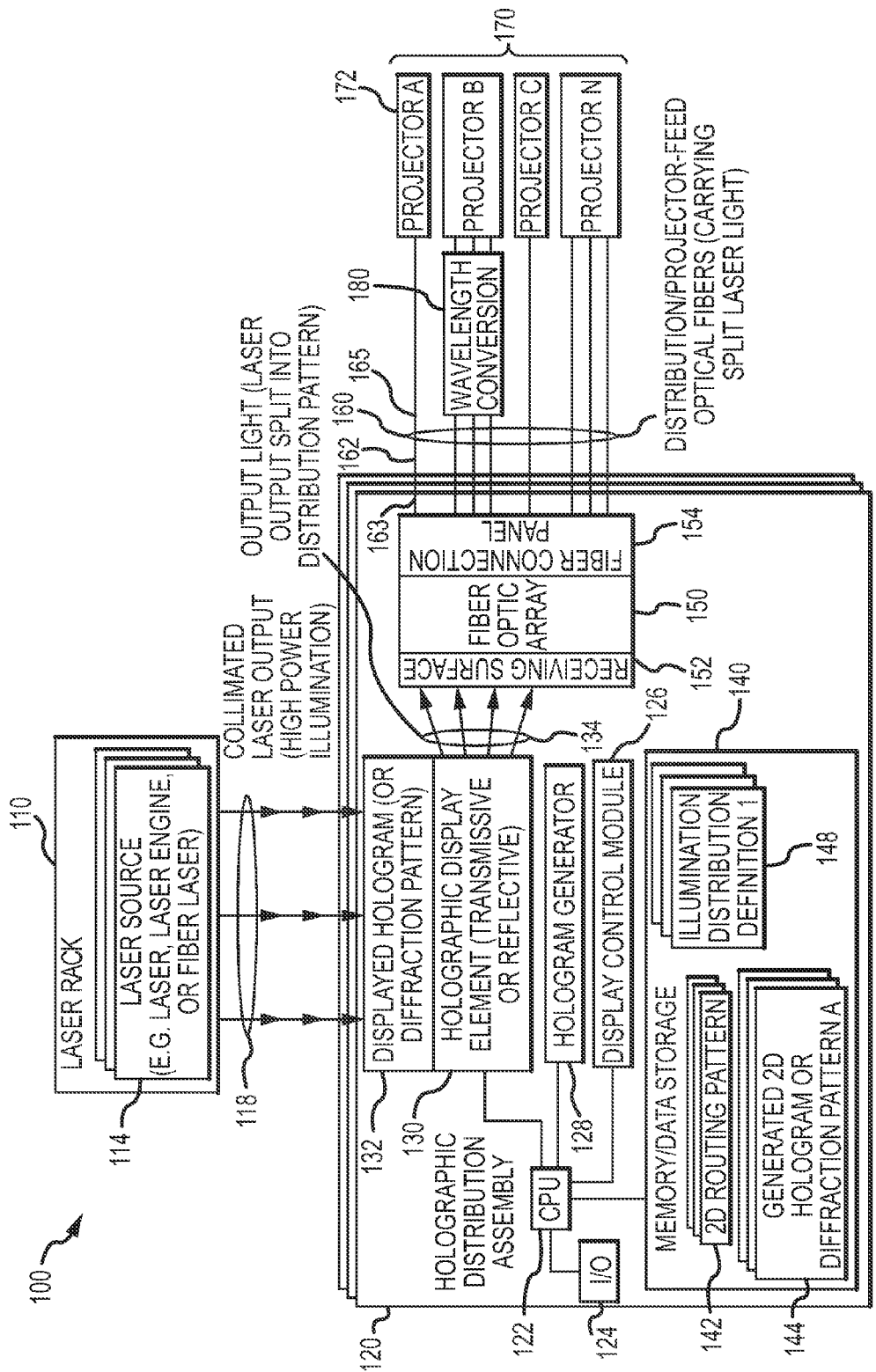
FIG. 1 is a functional block diagram of a holographic high power illumination distribution system as described herein.

FIG. 1 illustrates a system 100 that is adapted to split and distribute, in a switching or time-multiplexed manner in some cases, high-power illumination such as laser light or output from one-to-many lasers. The splitting and distribution is achieved through the use of holographic technologies including use of a displayed hologram to split and direct the laser light onto a fiber optic array (or fiber distribution panel). As shown, the high power illumination or laser light 118, which may be collimated by optics in the system 100 prior to delivery to a holographic display element 130, is provided by a laser rack 110. The laser rack 110 may take the form of one or more laser sources 114 that may be located remote from a set of projector/projection devices 170, e.g., a centrally located laser 114 may be used to provide high power illumination to a plurality of projector heads in one or more theaters, one or more theme ride sections, and so on. The laser sources 114 may take many forms to practice the system 100 such as conventional lasers and laser engines that may be monochrome, colored (R, G, and/or B), IR, or the like or such as fiber lasers. The output or laser light 118 is "high power" in that it may range from several hundred mWatts up to hundreds of Watts and even up to the kilowatt range (e.g., each of the projectors 170 may be 10 to 20 Watt-rated devices and a fiber laser providing 100 to 500 Watt output 118 may be used to drive operation of several to many of the projectors 170 by splitting and then distributing the laser light 118 to the projectors 170).

To divide and distribute the high power illumination/laser light, the system 100 includes a holographic distribution assembly 120. The assembly 120 may include one or more processors 122 to manage and operate components such as input/output (I/O) devices 124, memory/data storage 140, and holographic display element 130. Further, the processor 122 may be used to run or execute software or computer programs (in any useful programming language and based upon an operating system) such as a display control module 126 and a hologram generator 128. The I/O devices 124 may include keyboards, a mouse, a touchscreen, and a user interface (GUI) provided on a monitor or touchscreen, and the I/O devices 124 may be operated by a user of the system 100 to initiate the hologram generator 128 and to selectively control the holographic display element in a desired manner (e.g., using one or more of the illumination distribution definitions or programs 148 as explained below). For example, a user may use the I/O devices 124 to distribute the light 118 in a desired manner (e.g., setting splitting ratios and timing of delivery of light 160) to the projectors 170 to achieve a desired projection effect(s).

As shown, the assembly 120 includes a holographic display element 130 such as a spatial light modulator (SLM) that may be transmissive or reflective of the collimated laser output 118. To divide or split the light, the holographic display element 130 is operated by a display control module 126 and processor 122 to display a hologram or diffraction pattern 132, and the laser output 118 is directed (via optics in some cases in a collimated manner) onto or through the displayed holograph/diffraction pattern 132. The hologram 132 may be configured to split the laser output 118 into one, two, three, or many more streams or beams of light/illumination 134 that are directed onto a receiving surface 152 (or input portion) of a fiber optic array 150, perhaps through intervening optics in some cases. A plurality of distribution optic fibers 160 are connected at first ends to a fiber connection panel 154 of the fiber optic array 150 to receive the split beams/portions 134 and deliver/distribute the split light 134 to projectors 170 (or projector heads) via a second or distal end of each fiber 160 and, in some cases, via a wavelength conversion device 180. For example, one or more portions 134 may be delivered to fiber 162 with a first end 163 connected to the fiber connection panel 154 and with a second end 165 connected (i.e., optically linked) to a projector 172 (or its projector head), and, in response, the projector 172 operates to project using this portion 134 of the laser output 118 from the laser source 114 of the rack 110 to project chosen imagery.

The displayed hologram 132 is typically created or generated by the hologram generator 128 based on an input 2D routing pattern 142, which may be stored in memory 140. As shown, the memory 140 is used to store a plurality of 2D routing patterns 142 and/or pregenerated 2D holograms or diffraction patterns 144 related to the 2D routing patterns. Each defines a set of fiber connection locations on the connection panel 154 of the optic array 150 to which it is desired to deliver a fraction or portion of the laser output 118 via streams/beams 134 from the holographic display element 130.

For example, the optic array 150 may be adapted to have 12 fibers 160 optically connected to the panel 154 at 12 different connection locations. The 2D routing pattern may be designed to define the locations (and size and shape of the fiber ends/inlets) of a subset of the fibers connected at these 12 locations so as to direct the light 134 into a subset of the fibers. As is discussed below, the splitting of the power/illumination may be equal or may be provided using unequal ratios, e.g., 4 fibers of the 12 distribution fibers may each receive 25 percent of the illumination or one or more of the fibers may receive a different amount of illumination (e.g., send 20 Watts to 2 projectors 170 and 40 Watts to 2 projectors and so on).

Each routing pattern 142 is converted into a 2D hologram or diffraction pattern by the hologram generator 128 and stored in memory 140 as shown at 144. A user may then use the I/O 124 to choose to play via display control module 126 one of the generated 2D holograms 144 as a displayed hologram/diffraction pattern 132 on the display element 130 to achieve a splitting of light 134 onto the fiber optic array and delivery of light via fibers 160 to a subset of the projectors 170 (e.g., all or a number of the projectors 170 may receive fractions of the light 118 from the laser rack 110 using the displayed hologram 132). The hologram generator 128 may be configured to provide the 2D hologram using a Fourier transform or similar computation, e.g., to generate a Fourier Fresnel hologram or diffraction pattern. The generation of holograms using such computations is well known in the holographic industry such that detailed explanation is not provided in this description as conventional (or yet to be developed) techniques can be used to transform a 2D image into a 2D hologram, with an important aspect here being the creation and use of a hologram 144 from a 2D routing pattern 142 for distributing output of a laser rack 110.

A single 2D routing pattern 142 (and therefore 2D hologram 144) may be chosen by a user via the I/O 124 to distribute illumination from the laser rack 110. Then, when it is desired to add or delete a projector 170 or to change the ratio of delivered illumination 134 to the array, a new 2D routing pattern 142 may be selected or created and transformed into a new 2D hologram 144 for use in displaying a hologram 132 on the holographic display element 130. This allows relatively easy and quick "plug-and-play" of projectors 170 or changing of their outputs. However, in many cases, it is desired to switch between projectors 170 or change outputs of the projectors 170 over time or in a time multiplexed manner. In such cases, an illumination distribution definition 148 may be established and/or chosen by a user via the I/O 124 for use by the control module 126 in choosing a set of the holograms 144 for providing the output light 134 to the array 150 in a switched manner.

For example, each of the distribution definitions 148 may identify two or more of the 2D holograms 144 to play/display upon the display element 130 during an operation period of the system 100. Each of the distribution definitions 148 may further define an order the 2D holograms 144 will be displayed on the display element 130 and the timing of such displays. This timing may involve rapid switching between holograms (e.g., to deliver differing colored light 118 to different projector heads 172, to deliver light to right and left eye projectors 172, and so on) or may require switching for longer periods of time (e.g., to deliver light to projectors 170 used to project into a first section of an attraction or ride for a first period of time, to switch to deliver light to projectors 170 used to project into a second section of the attraction or ride for a second period of time, and so on during the operation of the system 100 and ride/attraction). The display element 130 is chosen to be able to carry out the desired switching speeds such as to support switching for 3D effects by rapidly switching between two or more of the generated 2D holograms 144 to display the hologram or diffraction pattern 132 to provide the desired splitting/dividing of high power illumination 118 as shown at 134.

Figure 2A:
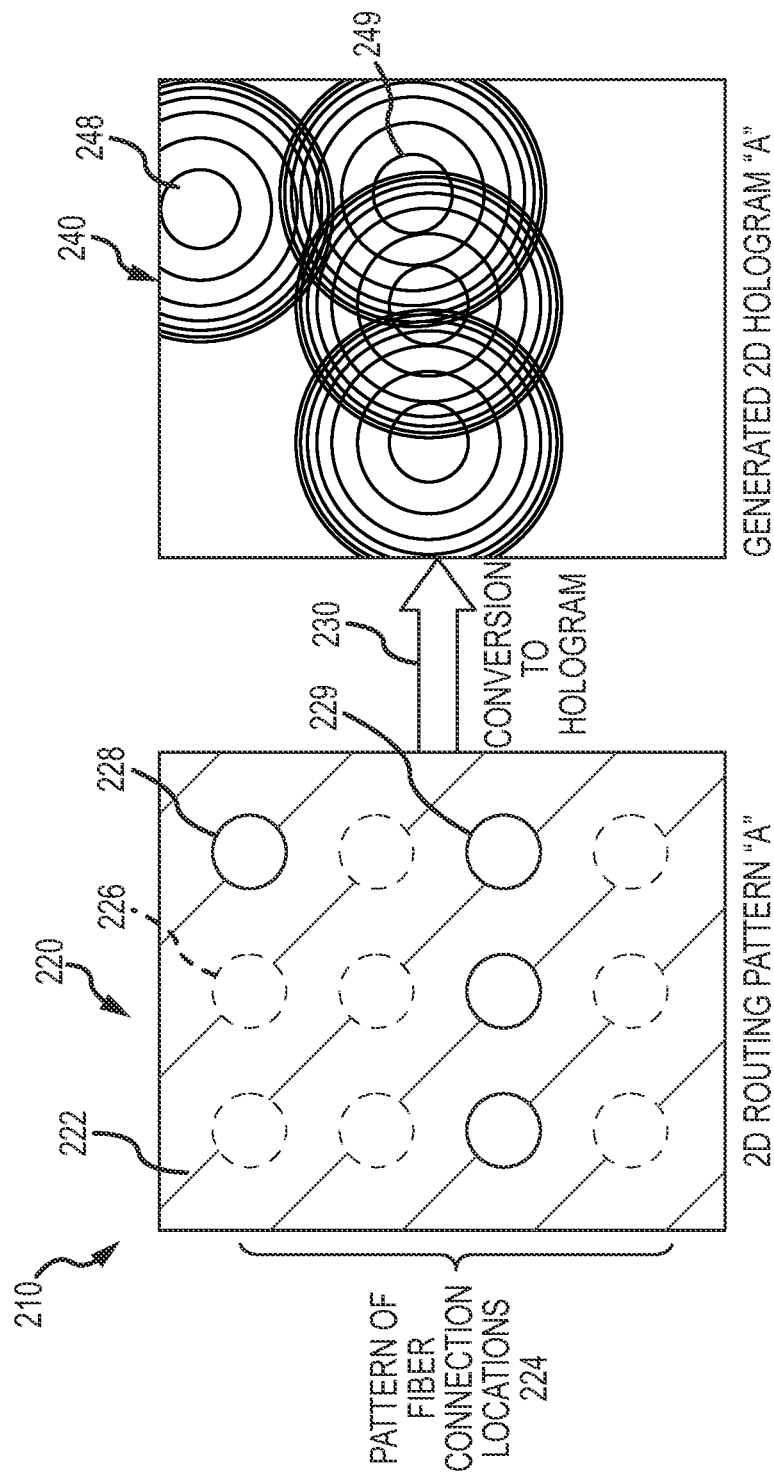

FIGS. 2A and 2B schematically illustrate the generation of routing holograms or diffraction patterns for use in a distribution system such as system 100 of FIG. 1. FIG. 2A shows a first 2D routing pattern 220 that may be used to define routing or splitting of a laser output to a set of twelve different optic fibers (or fiber connections) of a fiber optic array. The overall pattern of fiber connection locations is shown at 224 with four rows of three connection locations, although the fiber connection locations do not necessarily need to be laid out in a grid and may be randomly located or the locations may be designed to minimize potential crosstalk between fibers. The 2D routing pattern 220 is dashed as shown at 222 in areas of the optic array where no laser light or illumination is to be directed, and this may include a number of the fiber connection locations including connection location 226. In contrast, the 2D routing pattern is bright or white at locations where laser light or high power illumination is to be delivered and these fiber connection locations include locations as shown at 228 and 229.

A transform is performed at 230 to convert the 2D routing pattern 220 into a 2D routing hologram or diffraction pattern 240. This hologram 240 includes a set of diffraction patterns as shown at 248 and 249 that act to split light reflected from or transmitted through the hologram 240 onto the four connection locations provided in 2D routing pattern 220 (with the correct optics provided between the display element and the receiving surface of the fiber optic array). In this example, the laser light is split equally (or equal ratios) to each of the four connection locations 228, 229 such that one fourth of high power illumination is provided to each of the distribution fibers connected to the array at the connection locations.

To switch the distribution of illumination, a second 2D routing pattern 260 may be used and transformed as shown in the process 250 of FIG. 2B. As shown, the 2D routing pattern 260 also has a pattern of connection locations 264 made up of four rows of three connection locations for distribution fibers of a fiber optic array. Again, black or darkened areas 262 would not receive any of the distributed illumination, and in pattern 260 this may include connection locations that previously received a portion of the laser light such as location 266. White or brighter areas 268, 269 (which, in this case, were black/darkened/dashed in the first pattern 220) defined a set or number (here four) of the connection locations to which it is desired to direct or distribute a fraction/portion of the high powered illumination with a hologram. The overall incident illumination 118 may be adjusted as more illuminated connection locations (e.g., as shown at 268, 269) are added so that the overall illumination is increased. In this way, the existing projected illumination at each of the illuminated connection locations stays constant while the newly added illumination connection has the desired illumination level.

At 270, a Fourier transform or other conversion process is used to generate a 2D routing hologram 280 based on the 2D routing pattern 260, and the generated hologram 280 includes a number of diffraction patterns 288, 289 corresponding to the bright areas 268, 269 that cause light striking or passing through the hologram 280 (when it is displayed on a display element) to diffract toward or onto the connection locations associated with areas 268, 269 of a fiber optic array. Again, each of the connection locations 268, 269 has been defined with an equally bright object such that the high powered illumination is equally split or divided among the four distribution fibers optically linked to the fiber optic array at the four connection locations 268, 269.

In the examples of FIGS. 2A and 2B, the 2D routing patterns 220 and 260 were designed to equally divide the high power illumination from a laser (or laser rack) and direct it onto connection locations of a fiber optic array. In other cases, though, it may be desirable and useful to divide the high power illumination or laser light into unequal fractions or ratios. For example, it may be desirable to use projector heads with differing power ratings in a projection system such as in differing parts of an amusement park attraction or ride. In these cases, it would be useful to deliver portions of the illumination that suit each projector (e.g., at or near its power rating) rather than simply equally dividing the laser light from the laser rack. To this end, the 2D routing pattern may be designed to define the unequal splitting ratios or fractions to be used in the distribution.

For example, FIG. 3 illustrates a 2D routing pattern 300 that defines unequal splitting ratios of high power illumination using a gray-scale technique. As shown, the 2D routing pattern 300 may be used to choose which of nine different fiber connection locations 310 are to receive high power illumination and how much of the power will be provided to each chosen location. To this end, darkened, full blackened, or striped areas including some of the connection locations 310 will not receive any light (when a 2D hologram is generated from the 2D routing pattern 300). Areas that are fully white or brightest such as locations 312, 314 will receive greater portions of the high power illumination while areas that are a first gray scale such as the dashed/solid striped connection location 316 will receive a fraction of the illumination that is some amount less than the white/brighter colored locations 312, 314, and areas that are colored a second gray scale such as dashed/solid striped connection locations 318 and 319 will receive a fraction of the illumination that is an amount less than locations colored the brighter gray scale such as location 316. In this way, an almost infinite range of unequal ratios may be defined to the various fiber connection locations 310 to unequally distribute or split illumination using a hologram generated from the 2D pattern 300 (e.g., some SLM devices may provide hundreds of gray scale definitions that can be used to set a wide range of splitting or distribution ratios for the connection locations 310 of a 2D routing pattern 300).

As can be seen from the systems and devices of FIGS. 1 to 3, the inventor is proposing the use of a holographic, high-power illumination distribution module or assembly that can handle high optic power laser inputs and can provide high speed, reconfigurable interconnections with flexible splitting ratios into a fiber array. At this point in the description, it may be useful to illustrate one useful, exemplary high power illumination distribution system that may be operated over time to distribute illumination from a laser to a number of differing projector/projection devices.

Figure 4A:
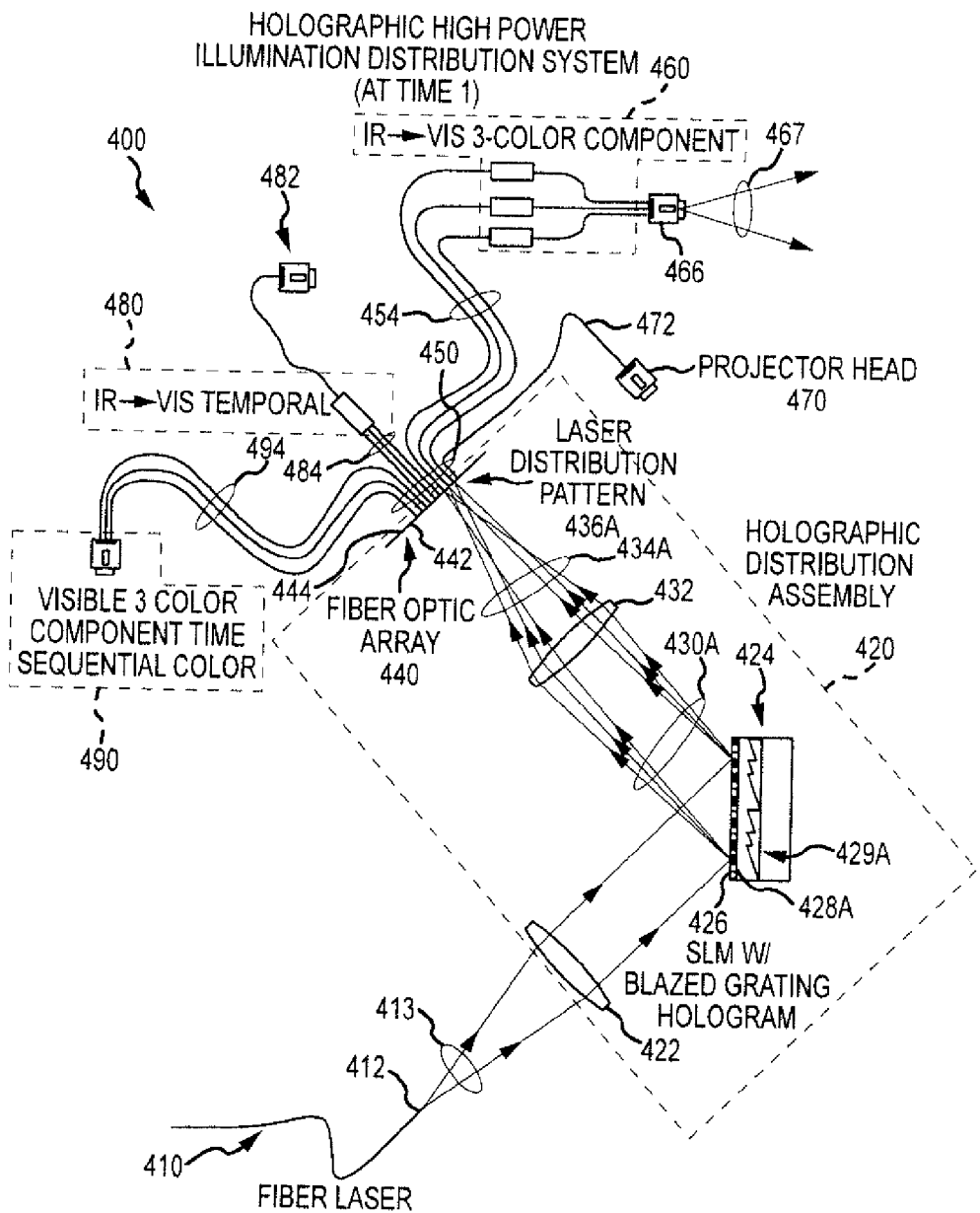
FIGS. 4A-4C illustrate an exemplary holographic high power illumination distribution system in three different operating states (or first, second, and third times during switching operations between three different routing or distribution patterns)

FIG. 4A illustrates an illumination distribution system 400 operating at a first time and in a first operating state (State A at Time 1, for example). The system 400 includes a laser source 410 in the form of a fiber laser with an outlet 412 from which high power illumination or laser light 413 is output and directed toward a holographic distribution assembly 420. In this example system 400, the holographic distribution assembly 420 includes input optics 422, a holographic display element 424 in the form of a programmable spatial light modulator (SLM) that is reflective (but transmissive SLMs may also be used), output optics 432, and a fiber optic array 440. The high power laser light 413 may be carried instead by an optical fiber from a laser or laser rack, and the light 413 enters the distribution assembly 420 and strikes the input optics 422. The input optics expand (and, typically, collimate) the light 413 onto a receiving surface 426 of the SLM 424.

The SLM 424 may take a number of forms to function to display a hologram or diffraction pattern 428A (a first hologram to be displayed at Time 1 to provide a desired splitting and routing pattern for the laser light 413). For example, the SLM 424 may be a DMD, a LCOS, an AOM, or other SLM and acting to display the hologram 428A, which may be a computer-generated holographic diffraction pattern (e.g., a 2D routing hologram as discussed with reference to FIGS. 1-3). In some embodiments, the distribution of the laser light 413 is made more efficient by using a hologram 428A in the form of a blazed grating hologram as shown at 429A with a particular index of refraction profile to provide desired diffraction angles (or reflection angles in the SLM 424 of system 400) across the hologram 428A. As discussed earlier, the hologram 428A is generated based on a 2D routing pattern for directing light to particular fiber connection locations on the fiber optic array 440.

In the operating state of system 400 shown in FIG. 4A, the holographic image 428A distributes the light 413 as shown at 430A into a desired pattern of multiple beams, which may each have the same or differing intensities (e.g., beams 430A have an intensity pattern defined by the hologram 428A displayed on the SLM 424). The beams 430A pass through output optics 432 (which may be optional in some systems 400) and are directed onto a receiving surface 442 of a fiber optic array 440. A plurality of distribution optic fibers 450 are optically connected to a back surface or connection panel 444 of the array 440, and the light 434A from the output optics 432 and SLM 424 are provided with a laser distribution pattern 436A (e.g., first 2D routing pattern that was used to generate the hologram 428A displayed on the SLM 424). The beams 434A, in other words, are coupled into a set or number of the optical fibers 450 that are connected to the array 440 at connection locations defined by the 2D routing pattern 436A.

The optical fibers 450 exit the distribution assembly 420 and feed light (when fed light 434A from the laser 410 by the hologram 428A) into a variety of optical engines of projector heads. As shown, the system 400 includes a projector head 466 with an optical engine 460 that receives laser light on fibers 454 in the form of IR light and converts this into visible colored light such as with a 3-color component. In the operating state at a first time as shown in FIG. 4A, the laser distribution pattern 436A is such that all the laser light 413 from the laser 410 is directed to the projector head 466 for projection as shown at 467 (after conversion to color via engine 460).

The system 400 also includes a projector head 470 that is supplied light, in different operating states than shown in FIG. 4A, via distribution fiber 472. The projector head 470 may be a conventional laser-based projection device based on three component "white" light and the use of a color wheel. The system 400 includes another projector head 482 that is supplied visible temporal light by an optical engine 480 that converts IR or UV light received from fibers 484 (which are connected at connection locations on the panel 444 of fiber optic array 440 to receive light in certain operating states of the system 400 not shown in FIG. 4A). Further, the system 400 includes a projection device 490 that is a visible 3-color component providing time sequential color via distribution fibers 494, which are coupled to the connection panel 444 of the fiber optic array 440 to selectively receive the 3-colored laser light 413 when 2D routing patterns 436 are produced by the holograms 428 (e.g., in a rapidly switching manner). As shown, the system 400 can be used to distribute visible colored light directly to projector heads and can also be used to distribute IR and/or UV light to wavelength converters.

Figure 4B:
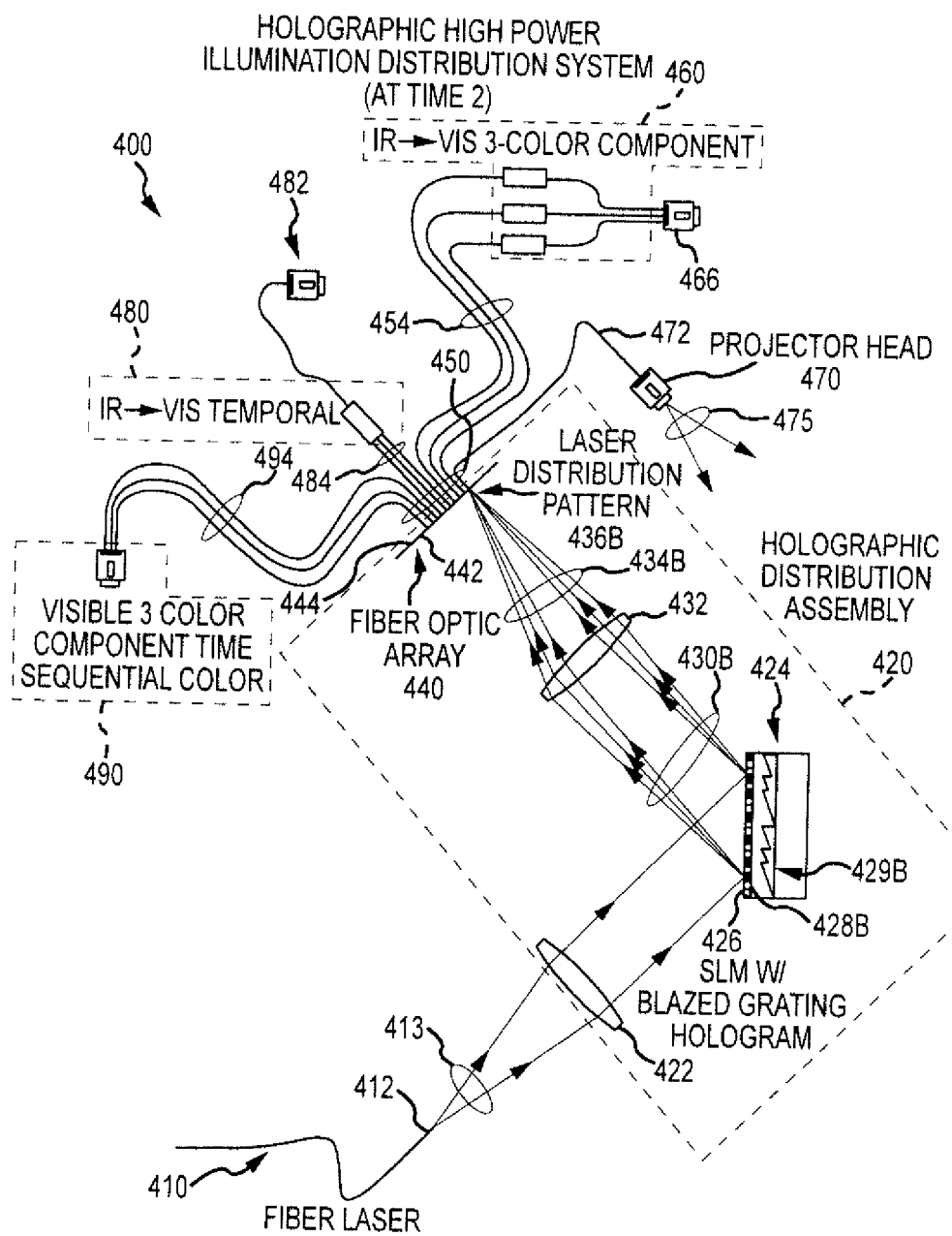

As discussed, one of the more valuable aspects of the use of holographic distribution is that it can be used to provide rapid and reconfigurable switching among projection devices. The switching is not fixed but can instead be changed simply by generating a new hologram for display. FIG. 4B illustrates the illumination distribution system 400 at a second operating time and in a second operating state that differs from the state shown in FIG. 4A (e.g., operating at Time 2 in Operating State B). The projection devices and/or their connection locations have not been changed, but a second routing hologram 428B is being shown with a differing refraction pattern 429B on the SLM 424. The hologram 428B is again a blazed grating hologram, although this is not a requirement for practicing the system 400 (e.g., less efficiency may be acceptable and/or other techniques may be used to capture/use the laser light 413).

As shown in FIG. 4B, the hologram 428B acts to reflect the laser light 413 input into the distribution assembly 420 into a set of beams 430B at differing angles and/or intensities. The output optics 432 direct the beams as shown at 434B onto the receiving surface 442 of the fiber optic array 440 with a second 2D routing pattern 436B (e.g., the beams 434B strike the array 440 at differing connection locations and/or with differing intensities than the beams 434A shown in FIG. 4A). As a result, the light 413 from the laser source 410 is distributed to the projector head 470 via distribution fiber 472 (which is coupled to the array's connection panel at the connection location defined by the 2D routing pattern 436B), and the projector head 470 projects light 475 into a projection space that, typically but not necessarily, differs from the projection space of the projector head 466 supplied in the prior operating state of system 400 shown in FIG. 4A.

Figure 4C:
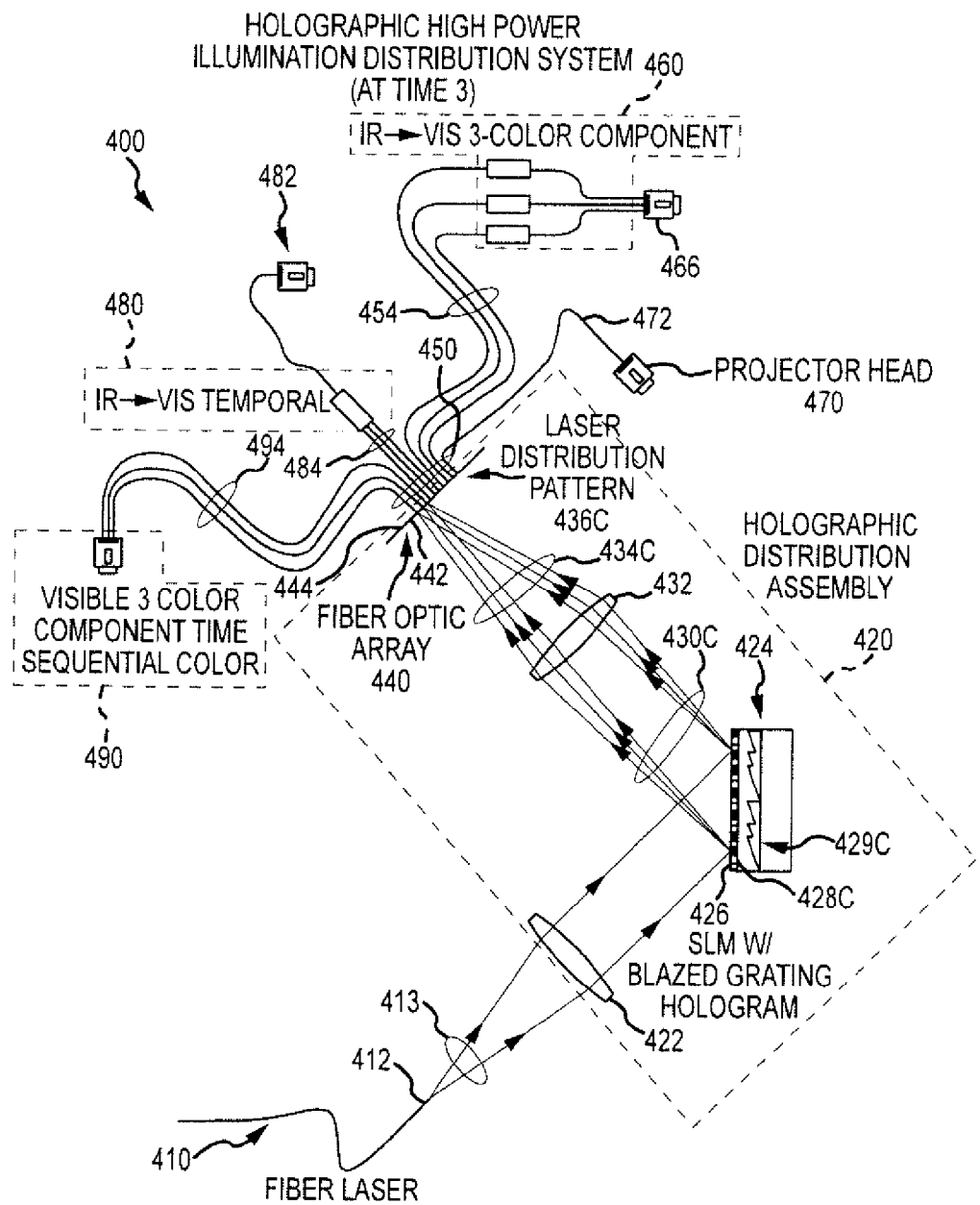

Further, as shown in FIG. 4C, a third and different hologram 428C is displayed on the SLM 424 with a third refraction pattern 429C. This hologram 428C functions to refract and/or reflect the light 413 from the laser 410 into a set of beams 430C in different directions and/or with different intensities than the beams 430A or 430B. The output optics 432 provide redirected beams 434C that strike the receiving surface 442 of the fiber optic array 440 in a third laser distribution pattern 436C. The pattern 436C provides the split laser light to the ends of the distribution fibers 494 that are coupled to connection locations on the panel 444 corresponding to the pattern 436C. As a result, the projection device 490 is able to project content (e.g., 3-color light) into a third projection space. The SLM 424 may be operated to switch rapidly between the operating states of FIGS. 4A-4C or to enter and hold each state for a desired time period (e.g., operate in each state for a time period corresponding with the movement of a ride vehicle being located in three different portions of a ride path, to provide three shows that are presented at three different times, and so on).

Figure 5:
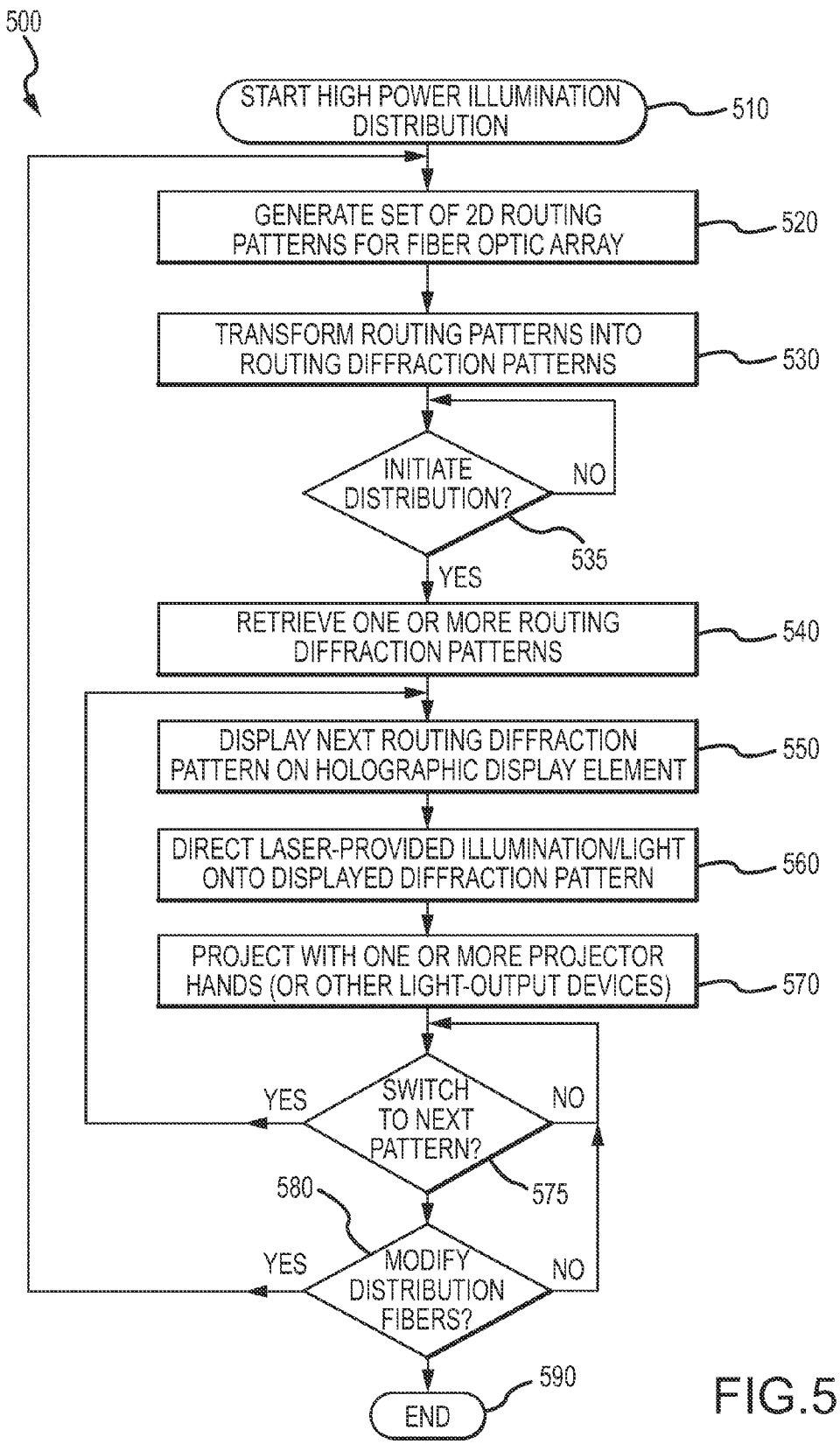
FIG. 5 is a flow diagram for a method of performing or providing distribution of high power illumination (e.g., distributing outputs of a laser farm to a plurality of projection devices).

FIG. 5 illustrates a method of distributing high power illumination such as may be carried out by operating of system 100 of FIG. 1 or system 400 of FIGS. 4A-4C. The method 500 starts at 510 such as with providing a laser source or sources in a laser farm, with coupling one or more laser outputs with a holographic distribution assembly (e.g., an SLM with a controller for selectively displaying holograms on the SLM to distribute split light onto a fiber optic array), and with coupling a first set of projector heads and/or projection devices to the fiber optic array via distribution optic fibers.

The method 500 continues at 520 with generating a set of 2D routing patterns for the fiber optic array and its particular connection locations. The 2D routing patterns typically will define which of a plurality of fiber connection locations on the array will receive light and at which intensity/power (the splitting ratio desired which may provide equal or unequal division of the high power illumination). At 530, the method 500 continues with transforming the 2D routing patterns into routing diffraction patterns or 2D holograms, and these are typically stored in memory or data storage that is accessible by a controller of the SLM that is used to display the holograms according to a predefined display algorithm (which holograms to display, when to switch between the holograms, and so on).

The method 500 then proceeds with step 535 involving determining whether high power illumination distribution should be initiated. If not, the method 500 continues with repeating step 535. If yes initiation is scheduled to begin or has been initiated, the method 500 continues at 540 with retrieving one or more of the routing diffraction patterns from memory. At 550, the method 500 includes displaying a next one of the routing diffraction patterns on a holographic display element (e.g., a SLM or other device useful for displaying holograms). At 560, the method 500 includes directing laser-provided illumination or light onto or through the displayed diffraction pattern. This causes the illumination or light to be split in equal or unequal ratios into one, two, or more beams and directed onto one, two, or more connection locations of a fiber optic array for distribution via optic fibers to one, two, or more projector heads. In this regard, the method 500 then continues at 570 with projecting with one or more projector heads (or other light-output devices) into one or more projection spaces.

The method 500 continues at 575 with determining (such as with a controller running a distribution control program) whether it is time to switch to a new 2D routing pattern. If not, the present pattern is displayed on the holographic display element and step 575 is repeated. If yes it is time to perform switching, the method 500 continues at 550 with displaying the next routing diffraction pattern on the holographic display element. At some point in time, it may be desirable to reconfigure the distribution system such as to change the switching times or to change the splitting ratios or to add or move a projector head. To this end, the method 500 may include step 580 that involves determining whether to modify the distribution system such as by changing/inserting distribution fibers on the fiber optic array to distribute light in a different manner (e.g., to new projectors or move projectors). If no, the method 500 continues at 575. If yes, the method 500 continues at 520 with generation of additional 2D routing patterns (e.g., to direct light to connection locations where distribution fibers for new projector heads have been coupled) and at 530 with generating new diffraction patterns or 2D routing holograms from the new 2D routing patterns. The method 500 may end at 590 after or during any of the steps 520-580.

Current SLMs, e.g., DMDs, LCOSs, and the like, are capable of handling up to 20 Watts/cm$^2$ of continuous optical power before they reach their optical damage threshold. Some commercial Acoustic Optical Modulators (AOMs) can handle 20 Watts (total) of optical power. Presently, projector companies are providing cinematic laser projectors that have 20 Watts of optical power on a 1.38-foot diagonal DLP DMD (about 5.5 cm$^2$) or 3.63 Watts/cm$^2$. Therefore, several large cinematic projectors or many more medium and/or small projectors may be handled/supplied with light by one SLM-based holographic distribution assembly. It is expected that future laser projectors will be increasingly brighter, which tends to indicate that SLMs will be able to handle the necessary power of a holographic distribution assembly as taught herein.

Calculating the holographic diffraction pattern may involve performing the Fourier Transform of the desired intensity pattern of multiple beams (e.g., the 2D routing or distribution pattern). The intensity of the distribution pattern may be defined using grayscale to set the different amounts of light to be sent to different output fibers in a particular fiber optic array (and to coupled projector heads). Although some common SLMs are binary, binary holograms are capable of producing grayscale images. The SLM may be rapidly updated. Therefore, the hologram and 2D routing pattern may be dynamic and rapidly updated or changed. This enables features such as "plug-and-play," reconfigurable illumination networks (for directing illumination only to occupied theaters and ride areas and the like) and time multiplexed illumination (as in time multiplexed color, polarization, and/or blanking).

Holograms displayed as a 1D or 2D intensity or phase distribution on a flat SLM have two or more (conjugate) copies of the holographic image produced symmetrically positioned around a central undiffracted beam. Since the illumination beams do not carry image information other than a general illumination level, these copies may be separately collected by fibers and directed to different projector heads. Alternatively, the light from the multiple images may be sent to separate wavelength converters (e.g., IR to visible color). This would be especially convenient if using six primary colors since the image copies come in pairs. Yet another alternative is to use a fixed fiber combiner and combine the two copies into a single beam.

The central undiffracted beam may contain 20 to 85 percent of the illumination depending upon the type of SLM used and hologram type (binary/grayscale quantization, amplitude/phase modulation, square/sinusoidal profile, and so on). Any central undiffracted beam may be sent to another illumination distribution assembly or may be recirculated back into the same distribution assembly and/or input optical fiber. If a fiber laser is used as the laser light source, the fiber is the resonating cavity usually with etched Bragg gratings at the fiber ends acting as the cavity mirrors. With the illumination distribution assembly in the fiber's path, the undiffracted beam can be reflected back into the fiber and lasing medium by the SLM or be sent to another fiber that is used as a pump beam for the original or a separate fiber laser or doped fiber amplifier.

Unlike holograms with sinusoidal or square modulation profiles, blazed gratings are known to produce very efficient (e.g., greater than 85 percent) single diffraction orders (without a conjugate copy) with no central undiffracted beam. For all holograms, the pitch of the grating determines the angle of diffraction. However, instead of sinusoidal or binary phase profiles, the blazed grating has a sawtooth phase profile that directs most of the energy into a single diffraction order. Using a phase-only LCOS SLM (for example) as holographic display element, non-mechanical, high-diffraction efficiency, single spot scanning is possible by varying the pitch and/or blaze angle of the sawtooth phase grating. For the high-power illumination distribution assembly, multiple spots with controllable intensity should be controlled. This can be achieved by using superimposed blazed gratings of different pitches and/or blaze angles (to achieve multiple spots) and amplitude/phase modulation (to achieve different spot intensities), and computed in a similar manner to a diffraction specific holographic rendering algorithm.

Stated differently, it may be useful to provide a high power illumination system that is more efficient in its use of the light from the laser farm or laser source(s). In reflecting or refracting the laser light with a hologram, some amount of light can be lost such as due to loss of diffractive pairs (e.g., copies of the light to provide a +1 diffractive order that is delivered as desired to the array, a −1 diffractive order that may be lost, and a 0 order (reflection) that may also be lost). As shown in the figures, a blazed grating hologram can be used to eliminate multiple higher diffractive orders and conjugate pair, with only one order of diffracted light being produced with such a hologram it is possible to achieve high efficiencies such as up to 90 percent in many cases, even with quantized modulation levels.

In other cases, though, it may useful to try to capture the −1 diffractive order and 0 order reflection. For example, these can be provided at connection locations of a fiber optic array for use as input to a projector. The −1 diffractive order may also be sent to color and/or a combiner (e.g., fiber coupler). In other cases, angle modulation can be used that is so "extreme" that all light in the −1 diffraction order and higher order reflection basically disappears. The zero order light may also be reflected with a mirror back into the source, e.g., back into a fiber laser. In other cases, the zero order light may also be captured, e.g., with a fiber(s), and returned to an inlet of a laser source, e.g., to an inlet of a fiber laser acting as a pump laser.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Prior devices used for splitting and distributing illumination had a number of limitations. Typical solid state devices were unable to handle high power associated with the lasers and laser farms described herein, e.g., unable to handle many to hundreds of Watts. Additionally, these devices or techniques generally led to a fixed number of branches (e.g., the number was fixed by the types of devices and/or at the time of assembly), and this prevented easy plug-and-play uses and made reconfiguration difficult. Also, the branches typically carried equal splits of the power and did not allow for unequal split ratios. In contrast, the holographic routing taught herein provides a flexible attenuation and split ratio that can be adjusted as needed for time scheduling illumination levels, plug-and-play capability, and/or future expansion (e.g., add projectors to a distribution array) or modifications (e.g., change out a projector with another that has different input demands). Further, the holographic routing devices can handle high power. With the holographic distribution assemblies, switching occurs with a change in holographic pattern, which can occur between 60 to 144 Hz and 1.4 kHz to 22 kHz depending on the SLM used, and this provides time scheduling illumination levels and routing and also plug-and-play capability.

In the systems discussed above, the laser sources may be used to provide a variety of laser light or high power illumination. For example, the lasers may be chosen to provide monochrome light. In other cases (or within the same rack), the laser(s) may be used to provide time sequenced colors, and each color may be distributed to different connection locations on the array panel using a different 2D routing hologram/diffraction pattern displayed on the SLM or other holographic display element (e.g., to provide the different colors on different distribution fibers for use by the same or different projectors). RGB lasers may be used that provide different input angles so one hologram may be used to distribute the outputs at same angles. In other cases, one or more IR laser may be used with the IR or UV light used by projector optical engines to create color (e.g., color generating components or color converters). The same routing distribution (fiber locations) may be desired for different wavelengths of light; however, the diffraction angle of the hologram is wavelength dependent. Either the three different holograms (each computed to appropriately diffract a specific wavelength of light into the desired routing distribution) can be sequentially and synchronously displayed with corresponding nearly collocated and/or collinear illumination of different wavelengths. Alternatively, the same hologram can be used to appropriately diffract the multiple wavelengths of illumination to the same routing distribution and with each color of illumination incident at its specific appropriate angle to allow that to happen.

I claim:

1. An illumination distribution system for distributing light from a high power source, for use by two or more projectors for projecting images, comprising:
a display element receiving light from a laser;
a fiber optic array with a plurality of connection locations for optical fibers;
a set of projectors that are each coupled to the fiber optic array at one or more of the connection locations with at least one optical fiber; and
a controller operating the display element at a first time to display a first hologram and at a second time to display a second hologram differing from the first hologram, wherein during the first time the first hologram splits the received light from the laser into a number of beams that are directed onto a first set of the connection locations to distribute the received light to a first subset of the projectors and wherein during the second time the second hologram splits the received light from the laser into a number of beams that are directed onto a second set of the connection locations differing from the first set of the connection locations to distribute the received light to a second subset of the projectors.

2. The system of claim 1, wherein a splitting ratio of the beams provided by the first or the second hologram is an unequal splitting ratio to distribute different amounts of illumination to differing ones of the projectors.

3. The system of claim 1, wherein the display element comprises a spatial light modulator (SLM).

4. The system of claim 3, wherein the received light has an optical power rating of at least 1 Watt.

5. The system of claim 4, wherein the received light is selected from the group consisting of monochrome coherent laser light, infrared (IR) radiation, ultraviolet (UV) radiation, time sequenced colored visible light, and multicomponent white light.

6. The system of claim 3, wherein the controller switches between displaying the first hologram and displaying the second hologram.

7. An illumination distribution system, comprising:
a display element receiving light from a laser;
a fiber optic array with a plurality of connection locations for optical fibers;
a set of projectors that are each coupled to the fiber optic array at one or more of the connection locations with at least one optical fiber; and
a controller operating the display element at a first time to display a first hologram and at a second time to display a second hologram differing from the first hologram,
wherein during the first time the first hologram splits the received light from the laser into a number of beams that are directed onto a first set of the connection locations,
wherein during the second time the second hologram splits the received light from the laser into a number of beams that are directed onto a second set of the connection locations differing from the first set of the connection locations, and
wherein the first and second holograms are blazed grating holograms.

8. The system of claim 1, wherein the first and second holograms generate diffractive pairs and wherein each of the diffractive pairs is directed onto one of the connection locations of the fiber optic array.

9. An illumination distribution system, comprising:
a display element receiving light from a laser;
a fiber optic array with a plurality of connection locations for optical fibers;
a set of projectors that are each coupled to the fiber optic array at one or more of the connection locations with at least one optical fiber; and
a controller operating the display element at a first time to display a first hologram and at a second time to display a second hologram differing from the first hologram,
wherein during the first time the first hologram splits the received light from the laser into a number of beams that are directed onto a first set of the connection locations,
wherein during the second time the second hologram splits the received light from the laser into a number of beams that are directed onto a second set of the connection locations differing from the first set of the connection locations, and
wherein the first and second holograms produce zero order light from the received collimated light and wherein the zero order light is directed to one of the connection locations, is reflected with a mirror back into the laser, or is captured and returned to an inlet of the laser.

10. A holographic illumination distribution apparatus, comprising:
a spatial light modulator (SLM) with a surface receiving output from a laser source;
memory storing a plurality of diffraction patterns each generated from a two-dimensional (2D) routing pattern for delivering light onto a fiber optic array; and
a display control module, run by a processor, sequentially displaying a set of the diffraction patterns with the SLM, wherein, during display of each of the diffraction patterns, the received output from the laser source is split into beams that are directed onto the fiber optic array in a pattern matching one of the 2D routing patterns and wherein each of the diffraction patterns is a blazed grating hologram.

11. The apparatus of claim 10, wherein the splitting by the diffraction patterns is unequal such that at least some of the beams have unequal intensities.

12. A method for holographically distributing high power illumination from a source to a plurality of image display devices, comprising: during a first time period, displaying a first hologram on a spatial light modulator (SLM); directing laser-provided light onto the displayed first hologram; with the displayed first hologram, reflecting or refracting the laser-provided light into one or more beams that are provided to a fiber optic array in a first 2D routing pattern associated with connection locations for a first set of optical fibers coupled to the fiber optic array;
during a second time period, displaying a second hologram on the SLM;
directing laser-provided light onto the displayed second hologram; and
with the displayed second hologram, reflecting or refracting the laser-provided light into one or more beams that are provided to the fiber optic array in a second 2D routing pattern differing from the first 2D routing pattern and associated with connection locations for a second set of optical fibers coupled to the fiber optic array.

13. The method of claim 12, wherein first time period corresponds with delivery of a first light-based show or effect in a first space and the second time period corresponds with delivery of a second light-based show or effect in a second space.

14. The method of claim 13, wherein the first space is first movie theater or a first portion of a ride path of an amusement park ride or attraction and the second space is a second movie theater or a second portion of the ride path of the amusement park ride or attraction.

15. The method of claim 12, wherein the first and second time periods correspond to times for providing left and right eye images for a three-dimensional (3D) movie with one or more of the projectors.

16. The method of claim 12, wherein the beams provided by the first hologram are unequal in intensity.

17. The method of claim 12, wherein the first or second hologram is a blazed grating hologram.

18. The method of claim 12, wherein the laser-provided light is output from a laser rack or farm and the SLM is an LCOS, a DMD, an AOM, or an optically addressed SLM (AOSLM).

* * * * *